(12) United States Patent
Ridihalgh et al.

(10) Patent No.: US 9,398,392 B2
(45) Date of Patent: Jul. 19, 2016

(54) AUDIO CALIBRATION AND ADJUSTMENT

(71) Applicant: MICROSOFT TECHNOLOGY LICENSING, LLC, Redmond, WA (US)

(72) Inventors: Robert Lucas Ridihalgh, Seattle, WA (US); Gregory Michael Shaw, Bellevue, WA (US); Todd Matthew Williams, Sammamish, WA (US); Tarlochan Singh Randhawa, III, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 14/320,073

(22) Filed: Jun. 30, 2014

(65) Prior Publication Data

US 2015/0382128 A1    Dec. 31, 2015

(51) Int. Cl.
*H04S 7/00* (2006.01)
*H04R 29/00* (2006.01)
*A63F 13/25* (2014.01)
*G06F 3/16* (2006.01)
*H04S 5/00* (2006.01)
*H04R 3/00* (2006.01)
*H04R 5/04* (2006.01)

(52) U.S. Cl.
CPC ............... *H04S 7/301* (2013.01); *A63F 13/25* (2014.09); *G06F 3/165* (2013.01); *H04R 3/005* (2013.01); *H04R 29/002* (2013.01); *H04R 29/008* (2013.01); *H04S 5/005* (2013.01); *H04S 7/303* (2013.01); *H04R 5/04* (2013.01); *H04R 2430/01* (2013.01); *H04S 2400/13* (2013.01); *H04S 2420/01* (2013.01)

(58) Field of Classification Search
CPC ........................................................ H04R 3/005
USPC ..................... 381/1, 57, 58, 103, 92; 324/318
See application file for complete search history.

(56) References Cited

U.S. PATENT DOCUMENTS

| | | | | |
|---|---|---|---|---|
| 5,461,314 A * | 10/1995 | Arakawa | ............ | G01R 33/3628 324/318 |
| 5,581,621 A | 12/1996 | Koyama et al. | | |
| 2002/0136414 A1 | 9/2002 | Jordan et al. | | |
| 2010/0232609 A1* | 9/2010 | Sungyoung | ............. | H04S 3/002 381/1 |
| 2014/0003625 A1 | 1/2014 | Sheen et al. | | |
| 2015/0201278 A1* | 7/2015 | Bao | ........................ | H04R 3/005 381/92 |

FOREIGN PATENT DOCUMENTS

| | | |
|---|---|---|
| GB | 2457508 A | 8/2009 |
| WO | 9740642 A1 | 10/1997 |
| WO | 2013150374 A1 | 10/2013 |

OTHER PUBLICATIONS

"International Search Report and Written Opinion Issued in PCT Patent Application No. PCT/US2015/038213", Mailed Date: Sep. 18, 2015, 15 Pages.

* cited by examiner

*Primary Examiner* — Md S Elahee
(74) *Attorney, Agent, or Firm* — Aaron Chatterjee; Judy Yee; Micky Minhas

(57) ABSTRACT

The subject disclosure is directed towards calibrating sound pressure levels of speakers to determine desired attenuation data for use in later playback. A user may be guided to a calibration location to place a microphone, and each speaker is calibrated to output a desired sound pressure level in its current acoustic environment based upon the attenuation data learned during calibration. During playback, the attenuation data is used. Also described is testing the setup of the speakers, and dynamically adjusting the attenuation data in real time based upon tracking the listener's current location.

17 Claims, 14 Drawing Sheets

AUDIO CALIBRATION AND ADJUSTMENT

BACKGROUND

Contemporary audio that is recorded for playback is typically configured in a studio setting by a developer or team of developers. This may apply to music, or as a combination of dialog, music and/or other sounds in the audio track that accompanies a game or movie. In general, the product developer has professional equipment such as a mixing board, sound meters and so on that are useable to adjust and set the recorded audio output to what he or she believes is an optimal listening experience.

However, when a consumer uses the product, it is rarely in an environment that comes close acoustically to the studio setting. For example, different users have different types and quality of speakers, positioned at different angles and/or heights, the number of speakers a user has may vary, and so on. Different users also have different acoustics in their listening environments, whether because of different flooring, furniture types and furniture positioning, walls, windows, drapes or blinds, room dimensions and so forth that each change the acoustics in a given environment. Still further, some users may set up their speakers incorrectly, e.g., wire left and right and/or front or back speakers in reverse.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards guiding a user to move a microphone to a calibration location relative to a plurality of audio speakers. For each speaker, calibration occurs, including outputting a calibration signal to generate audio output, adjusting an attenuation level associated with the calibration signal as needed until a desired sound pressure level as sensed at the calibration location is detected for that speaker, and associating the attenuation data with that speaker. The attenuation data associated with each speaker is saved in a set of attenuation data for the plurality of speakers.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
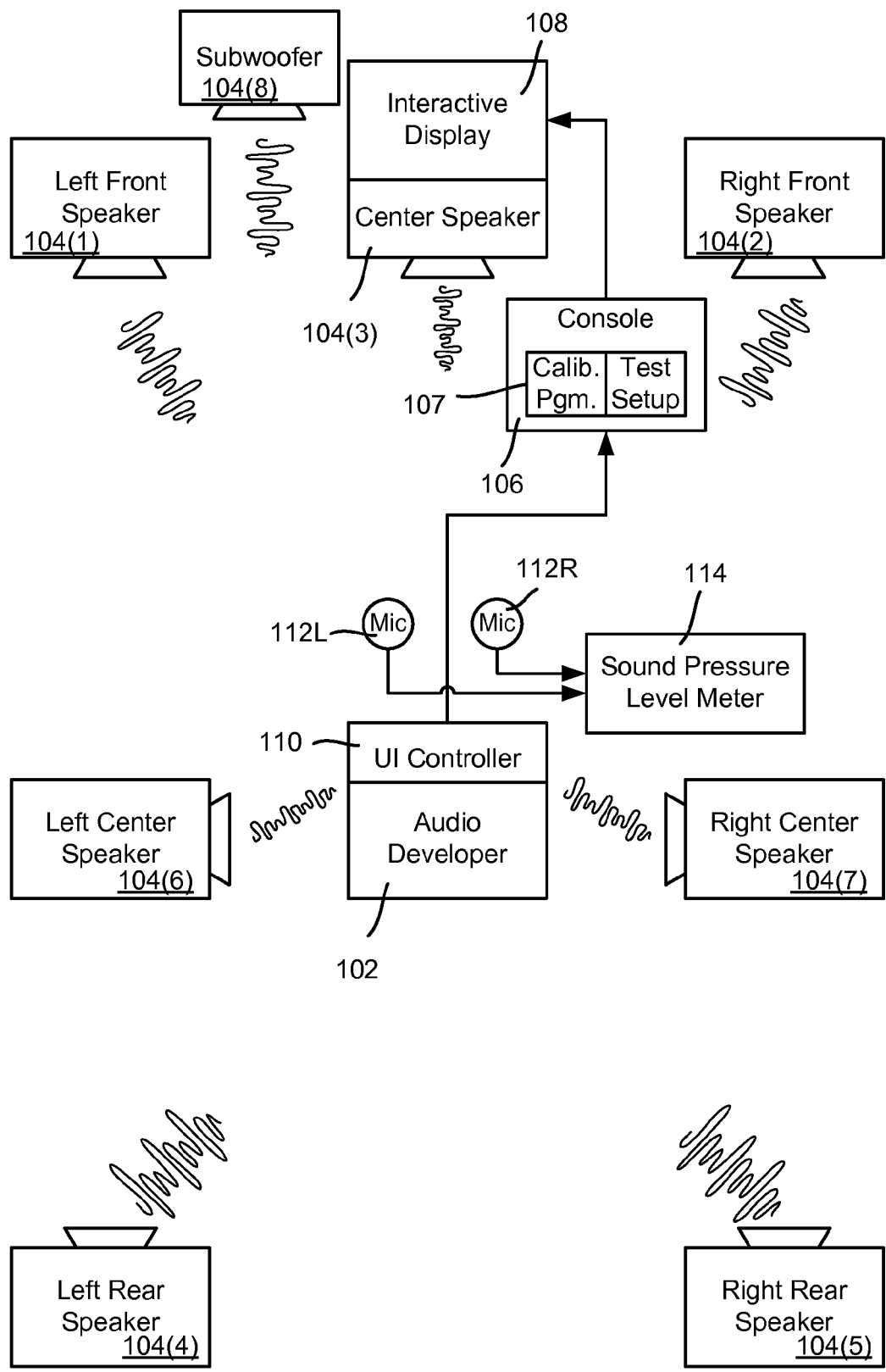
FIGS. 1-4 are example block diagrams each representing the calibration of speakers in different environments and/or in different speaker configurations, according to one or more example implementations.

Various aspects of the technology described herein are generally directed towards calibrating the sound pressure levels of an audio system's speakers, including (but not limited to) an audio system of a device such as a gaming and entertainment system that provides for user interaction via a display and controller. In one aspect, an application or the like streamlines the setup performed by a professional audio developer to deliver high quality audio for commercial products such as a gaming console, games, music, dialog and so forth. A similar application allows a consumer user to calibrate a personal (e.g. home) system so as to match the developer's expected/intended experience with respect to the quality and reproduction of the audio in the home or other user environment to the extent possible. By making the developer and user calibration application the same or relatively similar, a closer listening experience to that intended by the developer may be achieved.

The home calibration application may be mostly manual, leveraging user interaction with a user interface wizard or the like. Alternatively, the home calibration application may be largely automated, generally only asking the user only to locate a microphone or pair of microphones at a specified location and then to trigger the calibration.

In another aspect, the user also may be assisted by an application (e.g., the same application in another mode or a different application) to properly set up (and if needed debug) an audio system so as to hear entertainment as the developer intended it to be heard, or at least much closer than in traditional non-calibrated scenarios.

In still another aspect, calibration may be performed at different positions in a room to obtain different settings. For example, as a user moves to specified positions around the room relative to the speakers to be calibrated, as guided by user interface directions determined via readings from a position sensor (e.g., based upon Kinect® technology), different sound pressure levels may be calibrated for each specified position. As a result, the settings may be modified by the system to compensate (e.g., interpolate) for different user positions in an environment. Calibration may be performed for multiple user positions as well.

In yet another aspect, dynamic adjustment may be performed. For example, as a user moves around a room and has his or her position tracked, different sound pressure levels are computed (e.g., interpolated from the various previous calibration location settings) for the current user location. This allows the speakers to output audio at dynamically adjusted levels to more closely match the relative audio levels that the developer intended be heard by the user.

It should be understood that any of the examples herein are non-limiting. For instance, some of the example description and drawings primarily show a gaming and entertainment system, however other audio components such as a receiver or audio player may benefit from the technology described herein. Further, the technology is exemplified with respect to a home user, however the technology also may be used in an office, or in commercial environments such as a business open to the public. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in audio and computing in general.

FIG. 1 is an example representation of a professional studio type setup in which a developer 102 may use the technology described herein to calibrate an "ideal" audio product (e.g., a videogame) with respect to sound pressure output from a set of speakers 104(1)-104(8).

The developer 102 may connect and disconnect (physically or via software logic) certain ones of the speakers to calibrate for different setups, e.g., a 7.1 speaker setup with seven speakers and a subwoofer, a 5.1 speaker setup with five speakers and a subwoofer, and so on. Speaker connections are not shown for purposes of clarity, but it is understood that the speakers 104(1)-104(8) are coupled to a console 106 or other audio generation device via wired or wireless connections. As described herein, the console includes (at least part of) a calibration mechanism/program 107, which may include a calibration mode of operation and a "test setup" mode of operation. Note that the test setup operations may be performed in a separate program, but for purposes of simplicity are described as being a mode of the calibration program 107.

In general, during calibration, the developer 102 interacts via an interactive display 108 and a controller 110 each coupled to the console to adjust the product so that the speaker output from each active speaker is at a desired level for a particular speaker setup and a given product. The process is repeated for various speaker configurations, e.g., stereo, 3.1, 5.1, 6.1 and so on. The controller 110 used by the audio developer incorporates may be coupled to left and right microphones 112L and 112R to simulate a user's left and right ears, or may use a single microphone. A sound pressure level meter 114 (or multiple meters) indicates to the developer the sound pressure level currently detected by the microphone(s).

As can be readily appreciated, the studio calibration is performed in a generally ideal set of conditions. Even if an attempt was made to match the studio to a hypothetical average user's listening conditions, this would not be ideal for most users because so much variation exists among user environments and speaker systems. Indeed, users with a high end system in a room that approached a studio's characteristics would suffer if the calibration was directed towards a predicted "average" listener's system and environment.

To help users more closely match the developer's intended listening experience, the calibration technology described herein is made available to users to setup their home system or the like. In general, the calibration may be mostly manual with interactive guidance, partially automated, or fully automated. Further, the technology described herein is able to detect or help users detect whether they have connected their speakers properly.

Figure 2:
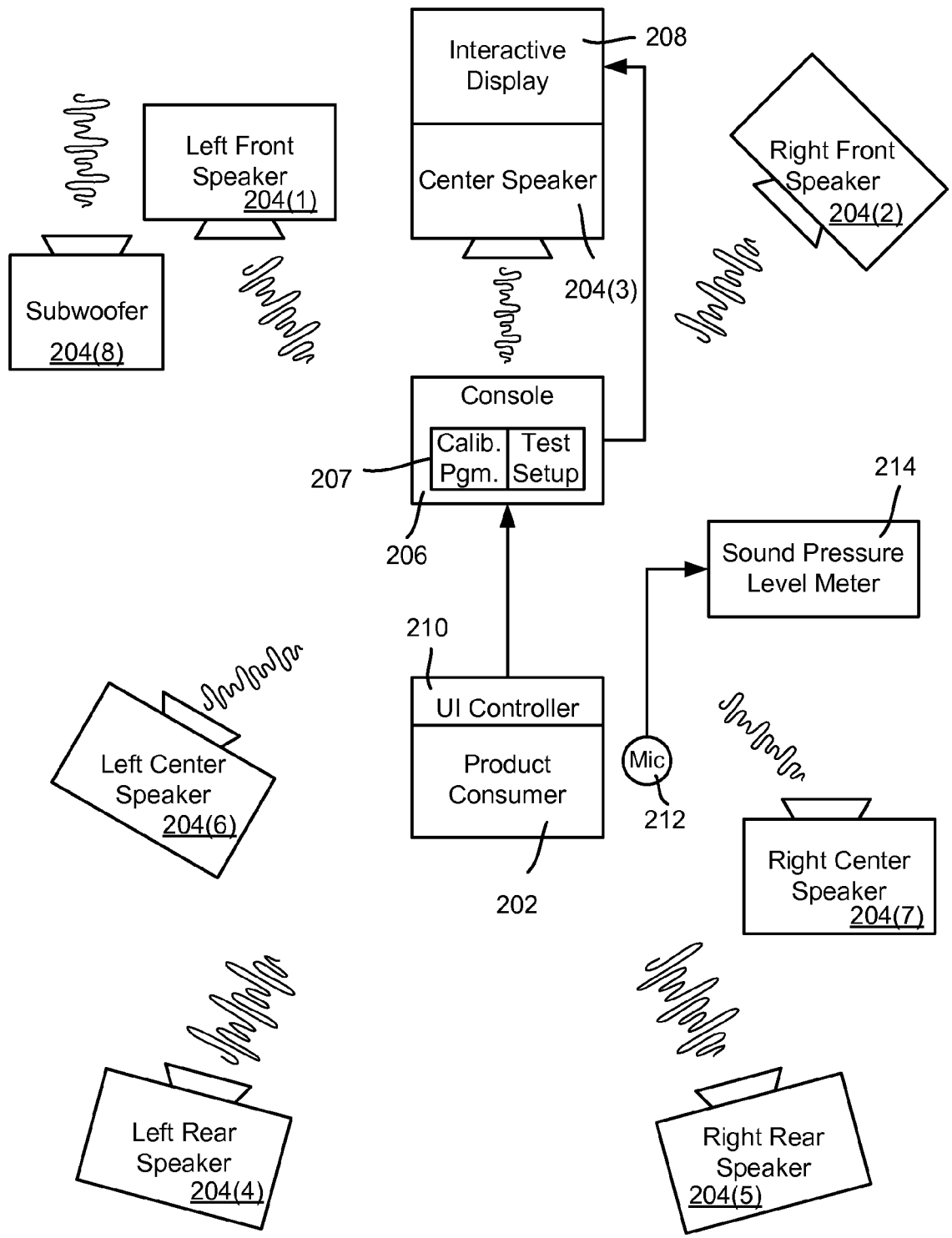

FIG. 2 shows a 7.1 speaker setup, with left and right front speakers 204(1) and 204(2), a center channel speaker 204(3), left and right center speakers 204(6) and 204(7), and left and right rear speakers 204(4) and 204(5), along with a subwoofer 204(8). In the example of FIG. 1, a user (product consumer 202) has a single microphone 212 coupled to a sound pressure level meter 214, although as can be readily appreciated, dual microphones may be present and used. Further, as described below, the sound pressure level meter may be incorporated into or coupled to a smartphone or tablet that also (typically) acts as the controller (and also may provide the microphone). As depicted in FIG. 2, at least some of the speakers are not positioned and/or angled in the same way as the studio configuration of FIG. 1, whereby calibration is beneficial to the listening experience. They also may be at different heights, of different quality and so on.

Figure 3:
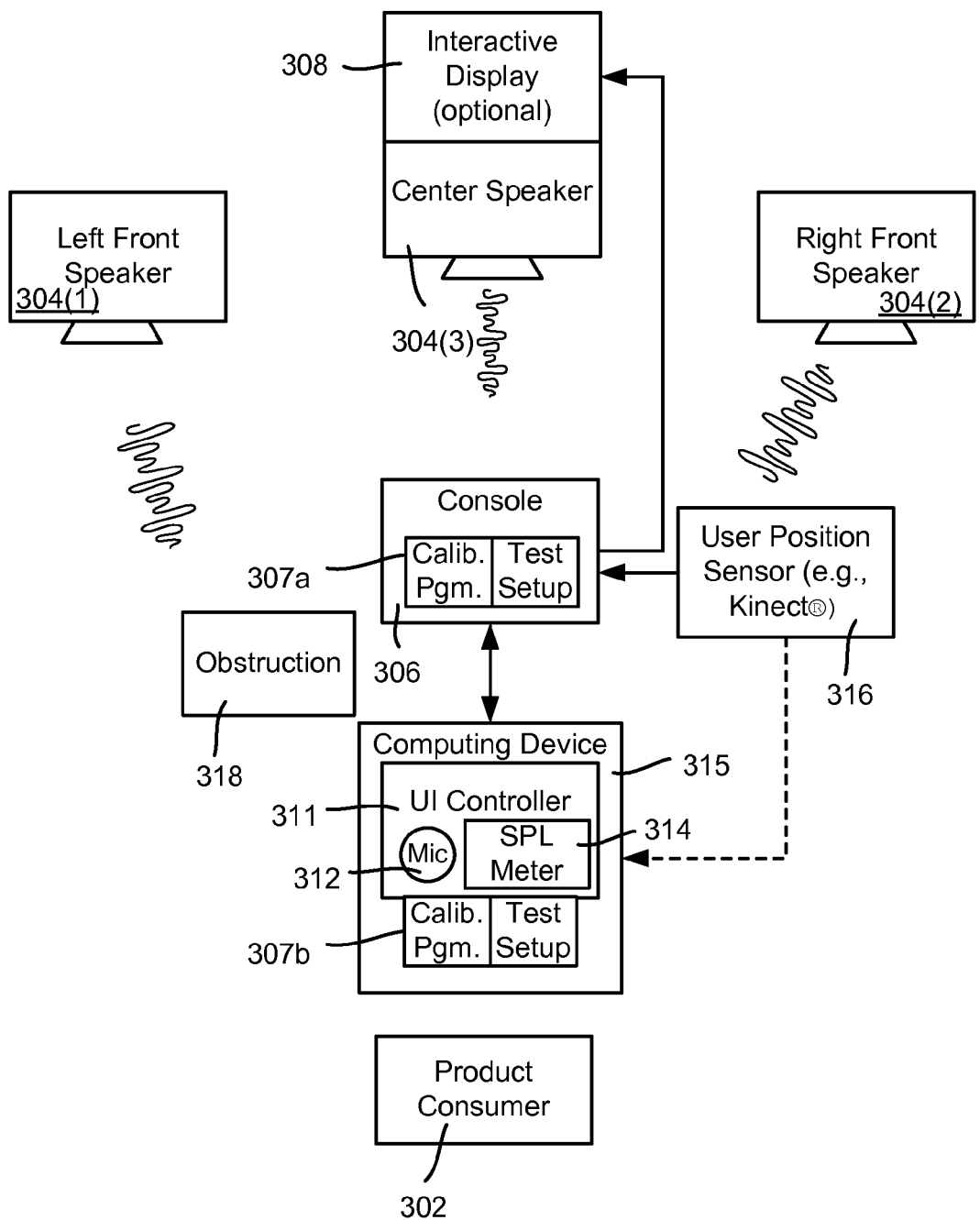

FIG. 3 is another example, in which three speakers are present in a user's system, along with an obstruction such as a piece of furniture or pillow leaning on and muffling the speaker that changes the sound level in some way, e.g., by absorbing or deflecting some sound energy. In FIG. 3, a position sensor 316 (e.g., using Kinect® technology) is present and may be used for user (product consumer 302's) position and depth sensing (e.g., via skeletal and/or head tracking). Further, in the example of FIG. 3, the sound pressure level (SPL) meter 314 is depicted as being incorporated into or coupled to a computing device 315 such as a smartphone, tablet, laptop, wearable device or the like that also acts as the controller 311, and further provides the microphone 312 in this example.

Note that in the example FIG. 3, some of the calibration and/or test setup operations may be performed on the computing device 315. Indeed, the interactive display 308 is optional in this configuration, because the device 315 may provide the interactive user interface operations. For example, the calibration program (and test setup mode therein or separate test setup program) may be split between the console and the computing device 315 (as represented by blocks 307a and 307b in FIG. 3). Indeed, the console 306 need not be present during calibration, provided the calibration signals can be otherwise output (e.g. through an amplifier) to the speakers, as the settings can be later uploaded from the computing device (or downloaded from another storage) to the console for playback. The playback may be without the computing device 315 coupled to it; (note that the computing device may be coupled to the position sensor 316 if present and separate from the console).

Figure 4:
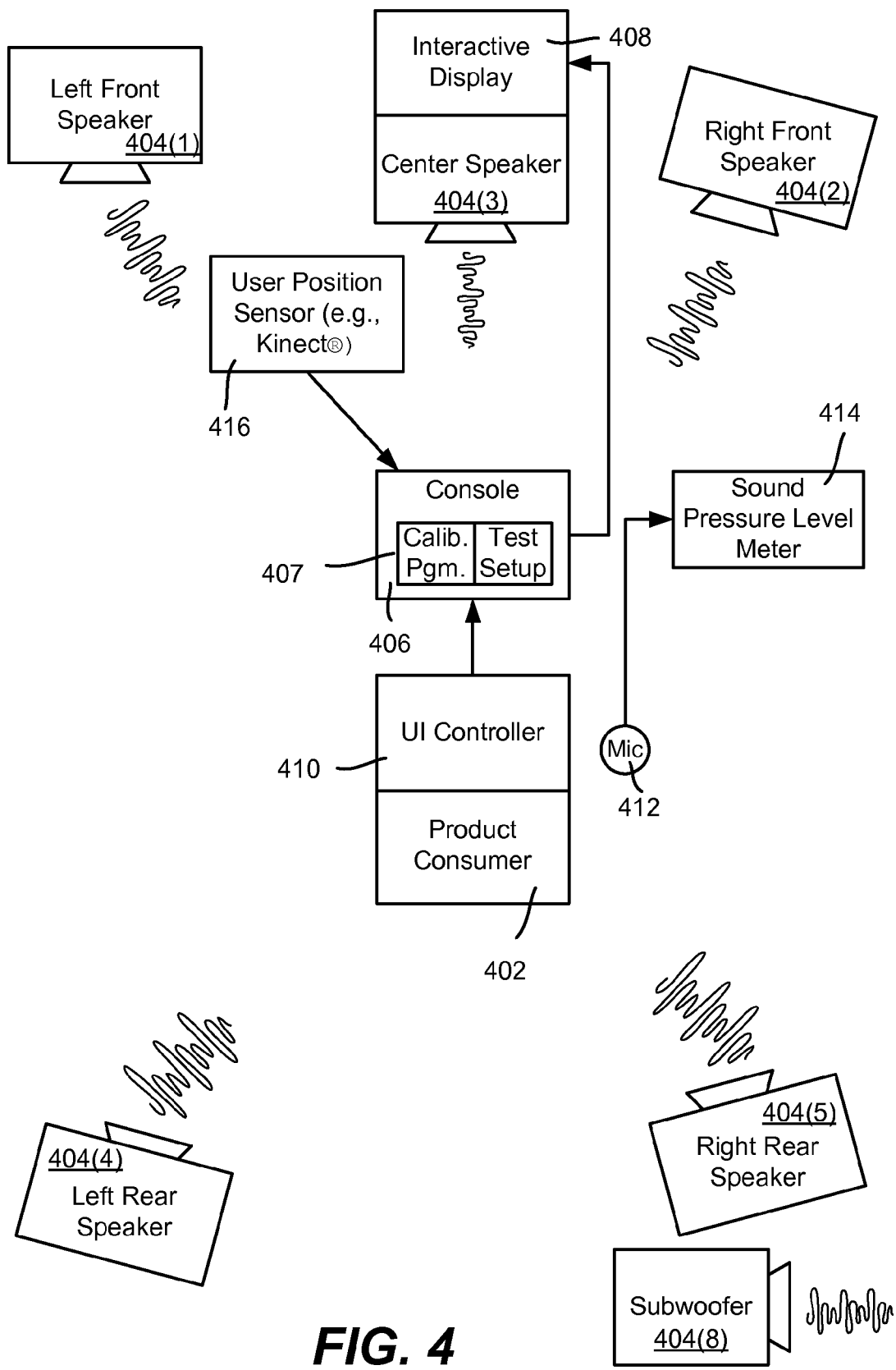

FIG. 4 shows an example 5.1 speaker system with a position sensor 416 and, in this example, a detached microphone 412 and sound pressure level meter 414. As can be readily appreciated, the same or a similar position sensor 416 may be used with any of the exemplified configurations in FIGS. 2-4, as can external detached microphone(s) and/or a sound pressure level meter relative to the controller, or microphone(s) and/or a sound pressure level meter coupled to or incorporated into a computing device. Thus, FIGS. 2-4 are only non-limiting examples of some of the many possible configurations a user may have in his or her environment.

With a detached (from the controller) sound pressure level meter, e.g., one that does not electronically communicate its readings to a receiver, the user will need manual calibration. The user may be assisted with manual calibration steps via audiovisual guidance. For example, as represented in the simplified interactive user interface 550 of FIG. 5A, (which may be a wizard), the user is able to enter a mode in order to interact to select a speaker, so as to test whether the user has connected that speaker properly. Audio, which may be in the form of speech (e.g., "front left speaker") or one or more tones or other audio such as white noise or pink noise is output by the console through the user-selected speaker, whereby the user knows if any speaker is properly or improperly connected.

Note that as an option, instead of having the user select each speaker individually, the test may cycle through the speakers, e.g., announcing "front left speaker" (and/or audio) followed a short time later (e.g., fifteen seconds) by "front center speaker," followed by "front right speaker" and so on, in any suitable order. A user interface such as the user interface 554 in FIG. 5B may be used to show the user the speakers that the system has detected (though not necessarily their location) and the speaker actively driving output (e.g., the right front speaker in FIG. 5B. Note that even the general position may not match the user's speaker positions, such as if the user mis-wired a speaker (or more than one). The test may time out, or the user may end testing manually (e.g., button 556).

Figure 5A:
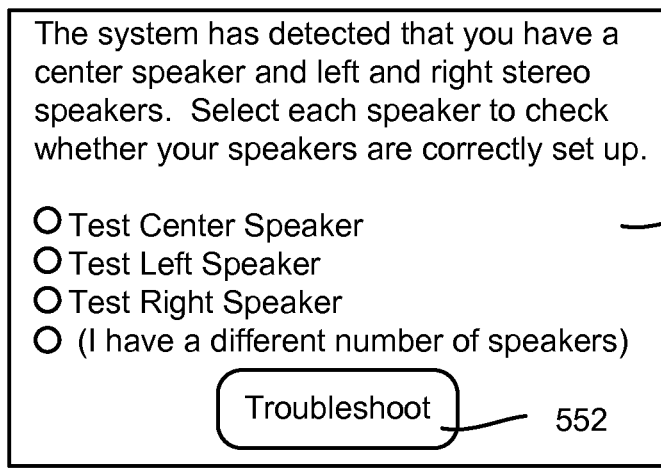
FIGS. 5A-5C are representations of example interactive user interfaces that may be used in audio calibration operations, according to one or more example implementations.

With respect to speaker detection, in general, contemporary gaming consoles have microphones, and those microphones may be used to detect each connected speaker and even estimate the position of each connected speaker based upon a known output to each speaker. However, detection may be imperfect, or the speakers may not all be connected, whereby the console can enter a troubleshooting mode to help the user, for example. In the example of FIG. 5A, the user is given an option for informing the console If the actual speaker configuration is not the same configuration as detected by the console. If, for example, the user had a 5.1 system and the user interface only showed three speakers, the user knows something is incorrect and can interact to inform the system of a problem; (note that such an interaction may be made elsewhere in the user interface).

As part of this mode, the user may be given an option (e.g., via an interactive button 552 of FIG. 5A or the button 557 of FIG. 5B) to troubleshoot a problem. For example, if the user has mis-wired the right speaker output to the left speaker and vice-versa, the user may request assistance. If selected, an interactive dialog, wizard and so forth may be launched to help the user.

In a situation where there is no communication between the sound pressure level meter and the console, the user may manually set each speaker to a desired level. For example, in the exemplified interface 558 of FIG. 5C, the user may interact with controls (e.g., 560) such as to move a slider bar and/or click on up or down arrows or the like via the controller until the sound pressure level meter (detached from the controller) indicates a desired level for a given speaker. The user interface may be configured to guide the user through each speaker adjustment. The amount that each speaker needs to be adjusted, e.g., the calibration setting for that speaker, is maintained as a set of attenuation data in the console or other audio device for use in recreating the levels during subsequent audio playback. Instead of or in addition to local storage, the attenuation data may be maintained in a cloud or other remote storage and downloaded when needed.

The application may include a piece of music (a reference piece) that the user can play after calibrating their system so they can hear the reference piece on a calibrated system. The user may select the reference piece, or the system may provide one by default. The reference piece may be from a videogame, and may be an audio clip recorded during a portion of an actual game played by a user.

Figure 6A:
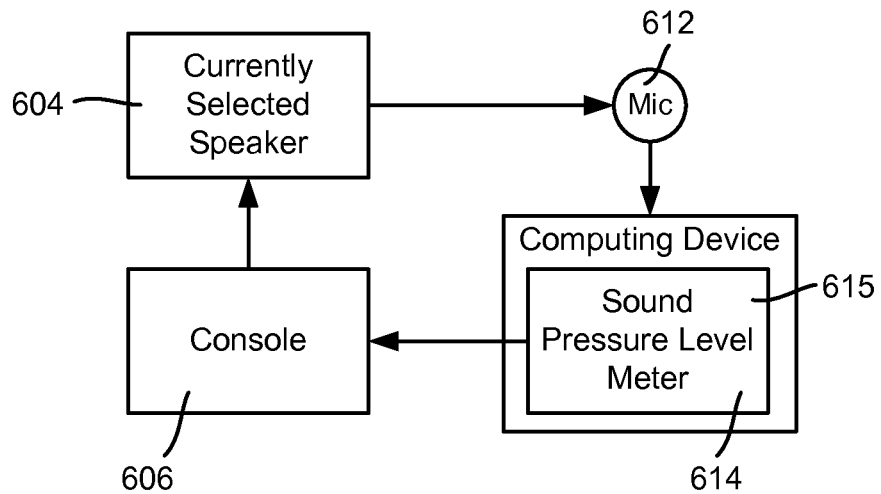
FIGS. 6A and 6B are representations of examples of ways in which calibration operations may be automated or semi-automated, according to one or more example implementations.
Figure 6B:
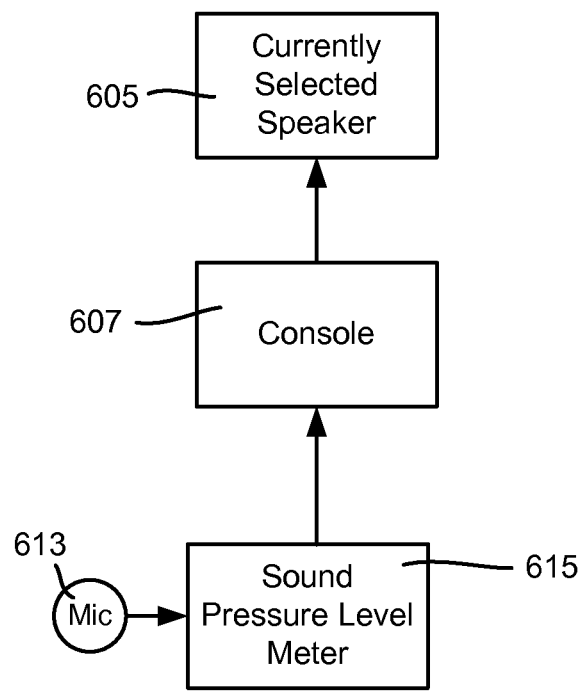

In the event that the sound pressure level meter is incorporated into or coupled to the controller, e.g., a smartphone or tablet computing device acts as the sound pressure level meter and the controller (and typically includes the microphone), automated calibration may be used (e.g., FIG. 6A). Automated calibration is also feasible if the sound pressure level meter is capable of communicating its readings to the console (e.g., FIG. 6B), or if the microphone is coupled to the console by wire or a wireless coupling and the console includes (e.g., runs an application that acts as) a sound pressure meter. Still further, a console with one or more built in microphones or device such as Kinect® that is coupled to the console may be moved around to each calibration position to obtain the sound pressure level meter readings.

FIG. 6A shows a sound pressure level meter 614 incorporated into or coupled to a computing device 615 that can communicate the meter's readings to the console 606 that is providing the speaker output to a currently selected speaker 604. In general, after the user positions the microphone or microphones 612, e.g., as specified via the console 606, the sound level is communicated back to the console 606 and adjusted up or down automatically, in a communication "feedback" loop until the desired level is sensed for each speaker.

In a fully automated system (that is, except for microphone placement), calibration may be transparent to the user, and may be performed for each piece of media rather than as a whole for a console. For example, a game may play music while loading (or even while playing), and that music may be used to adjust the levels to match a developer's intended levels. Streaming video may include metadata that the console may use to recalibrate the system for any portion of the video.

Skeletal tracking may be used to adjust for the user's position relative to the microphone; for example, if the user is detected as holding a tablet or game controller with the microphone, the calibration "sweet spot" can be moved back (and possibly upwards) to be closer to the user's ears. A microphone (or smartphone or tablet built in or add-on device) may be provided that allows its position to be detected, e.g., the microphone or add-on device may put out an infrared pulsing pattern that the console (or Kinect®) detects to compute the precise location of the microphone. The user may be instructed as to where to place the microphone for calibration, as well as where to sit or stand for the optimal experience during actual playback.

A user also may override calibrated settings either manually or by providing the console with information that may be reused for override. For example, if a user does not hear particularly well out of one ear, the user can manually adjust the settings after calibration until desired sound is heard in each ear. The console may help with the override, e.g., after calibration, the console may play sounds and ask the user to balance them via the controller until a desired state is reached. Note that the system may return information to the user regarding this issue, e.g., "it appears that your left ear's hearing is 20% reduced relative to your right ear." The user and/or console may use this knowledge in any future recalibrations that may be performed.

With respect to user positioning, a technology/device capable of position sensing such as Kinect® can instruct the user on where to approximately stand (or sit) in order to match the "sweet spot" position that the developer was at when the studio operation occurred, e.g., with the user's guided position based upon test audio output and sensed through the speakers. It is also feasible for the user to perform calibration at a number of different locations (e.g., relative to the speaker locations), and have the console software record the settings. Then, if the user moves around during the actual audio playback and the position sensing is active, the runtime may dynamically compute (e.g., interpolate) sound levels for the speakers based upon the user's current position, basically operating to move the sweet spot with the user in real time.

Even without active position sensing, a user may calibrate the levels at different positions and later use the settings. For example, a user may have a position A that corresponds to a favorite gaming chair and a position B where the user stands up and plays a game. The user may calibrate at both positions, and then during game play, interact to inform the console of the current user position as being at either A or B. Although the user may not be in the most optimal "sweet spot" as intended by the developer, the speaker levels can be adjusted for each such position to improve the sound quality relative to the calibration settings for a different position, or no calibration at all.

Figure 7:
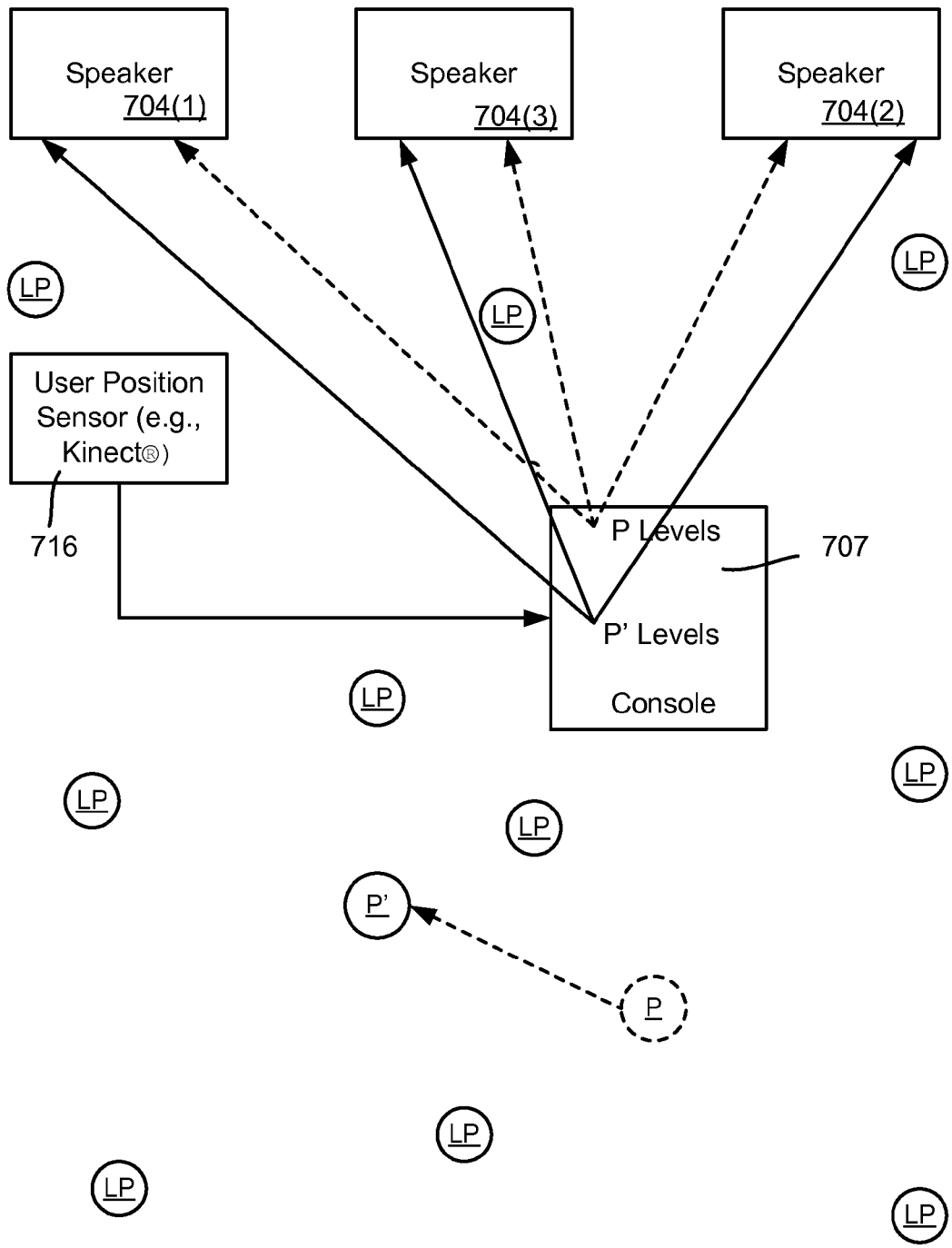
FIG. 7 is a block diagram representation of an example of using different attenuation data to adjust speakers' sound pressure levels depending on a user's location, according to one or more example implementations.

FIG. 7 represents using different speaker settings at one position P versus another position P'. Note that selection of the settings may be based upon dynamically tracking the user, or by the user selecting one of the two positions. Further, note that the settings at a given point may be interpolated from previously-obtained calibration settings corresponding to other locations, e.g., the interpolation locations "IP" in FIG. 7.

Further, there are likely to be many situations where multiple users are present. The calibration may be performed, with the settings adjusted for the actual or likely position of each user. Contemporary console software and position sensing devices already detect multiple users and their positions, and thus if present, the console may adjust the sound levels according to previous calibration data (and other data such as learned in test environments) to attempt to best accommodate each user/user relative positions.

In one or more aspects, there is thus provided a calibration application designed for a console or other audio device that allows the user to output audio (e.g., speech, pink noise and so forth) for testing a setup and/or calibrating speaker levels. The technology also allows for automatic calibration. For manual calibration, the audio calibration application may provide a tutorial and guided "walk through" assist mode. The calibration application may calibrate listening environments for any practical number of speaker setups, including stereo, 2.1, 3.1, 5.1, 6.1, 7.1 and speaker setups that are include height, as well as be extensible for speaker setups. Custom speaker setups may be input into the system.

Figure 8:
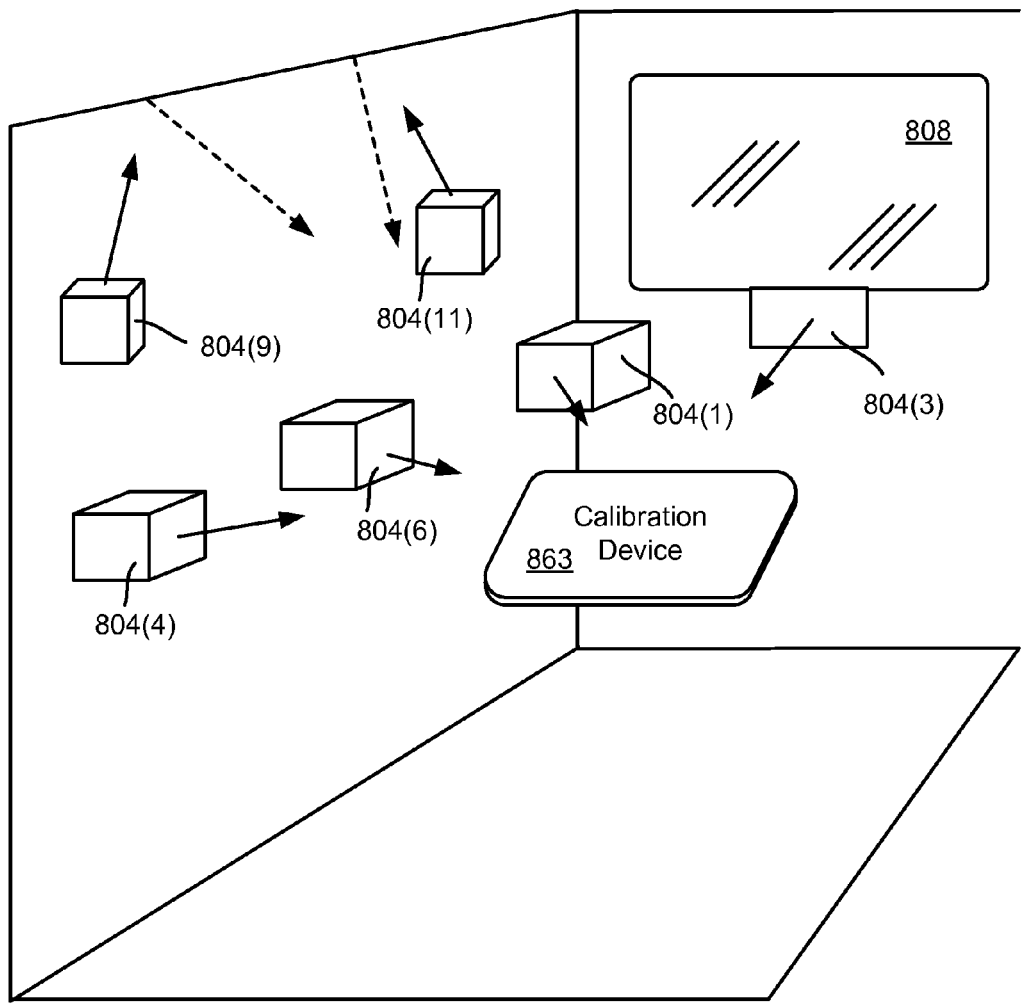
FIG. 8 is a representation of an example speaker (e.g., partial) configuration including for calibrating speakers that are arranged to output sound for a user to perceive as having a relative height, according to one or more example implementations.

FIG. 8 shows the concept of "height" calibration via a (partial) set of speakers (collectively 804 in FIG. 8) to a calibration device 863. More particularly, in many scenarios, contemporary speaker technology is moving towards having some speakers aiming sound down (or up for ceiling reflection back down) to the listeners. As can be readily appreciated, the calibration and playback technology described herein may facilitate calibrating sound levels for any practical number of speakers arranged in one, two or three dimensions.

Automated calibration is likely advantageous in a system having a relatively large number of speakers so as to not burned or discourage users by having to go through a long manual calibration procedure.

Figure 5B:
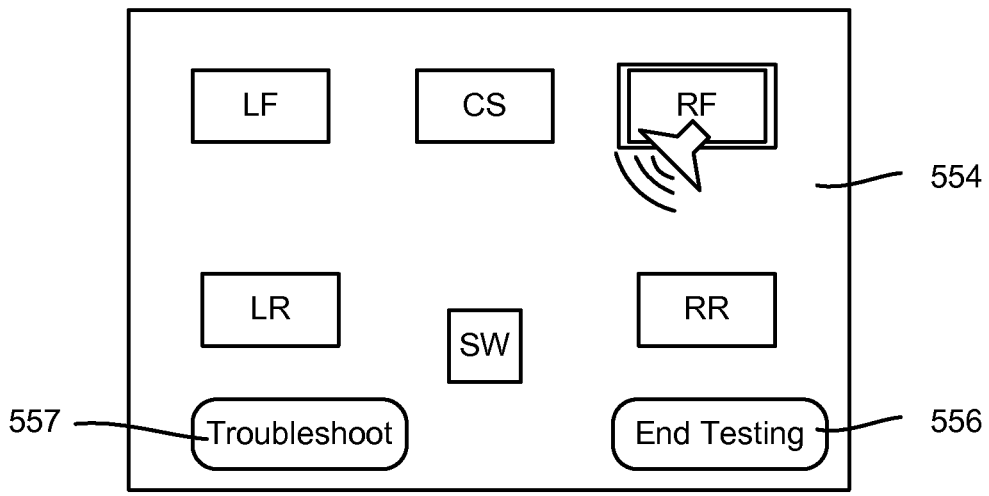
Figure 5C:
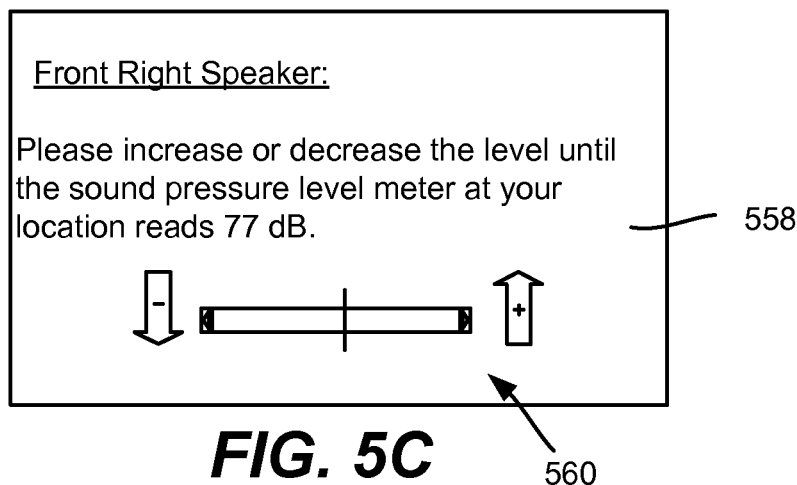
Figure 9:
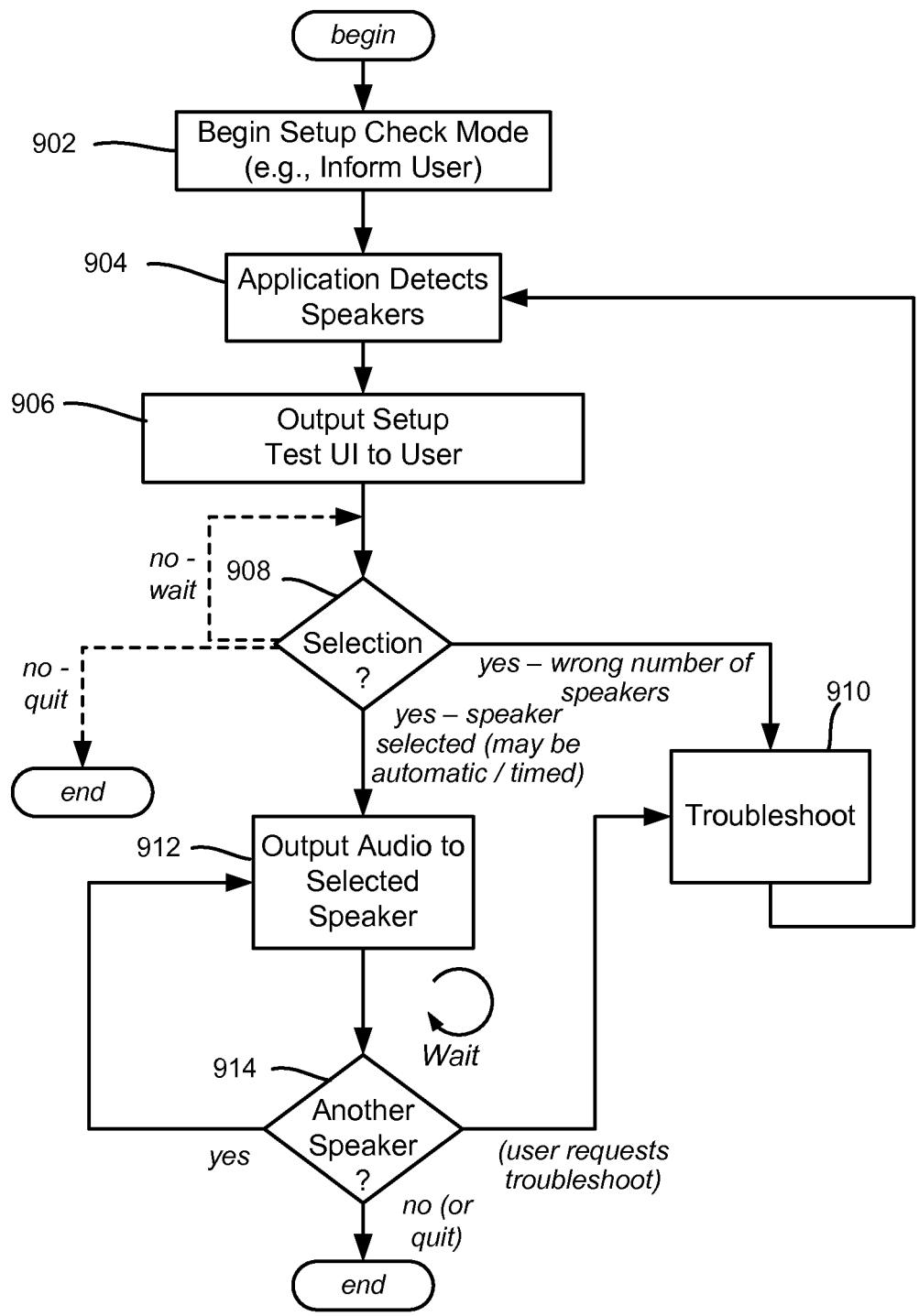
FIG. 9 is a flow diagram representing example steps of a generally manual user speaker configuration setup test, according to one or more example implementations.

FIG. 9 shows example steps for checking a user's setup, such as exemplified above with reference to FIGS. 5A and 5B. Step 902 begins the user interface, such as with a brief explanation, and step 904 represents detecting the user's speakers.

Step 906 outputs a user interface to the user to begin the setup test. Selection of a speaker at step 908 may be manual as in FIG. 5A, or automated (speaker selection is automatic and timed). The user also may elect to get assistance via troubleshoot, for example (step 910).

Step 912 outputs audio to the selected speaker, e.g., speech or pink noise, which the user may select. After some wait for a timer or user input (selection of another speaker or a user requesting troubleshooting), step 914 repeats the process until each speaker has been tested or the user has stopped the test in some way. Note that a speaker may be tested more than once, e.g., an automated/timed selection testing cycle may be any number of times before step 914 automatically ends the process (if at all).

Figure 10:
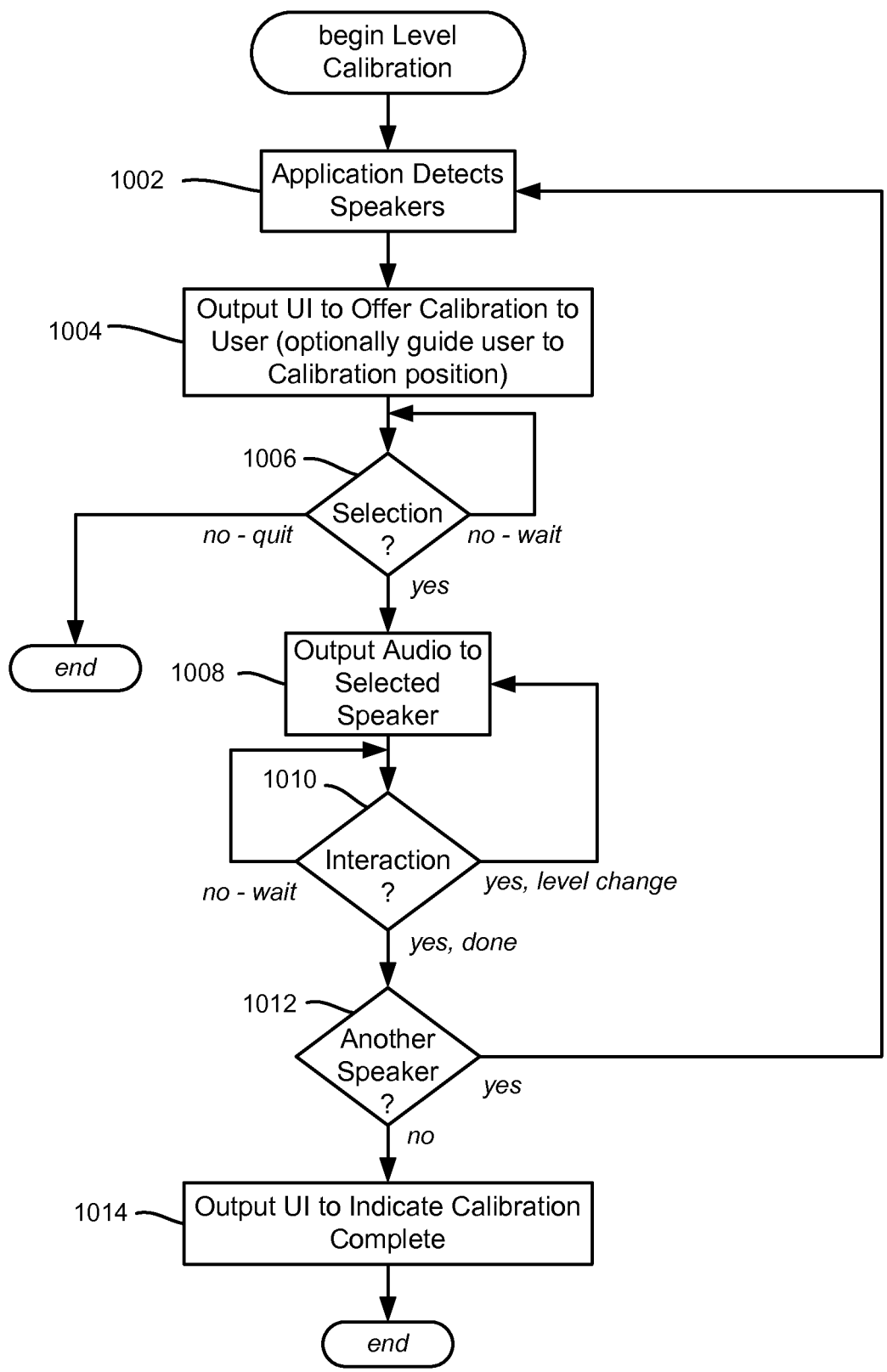
FIG. 10 is a flow diagram representing example steps of a generally manual speaker calibration process, according to one or more example implementations.

FIG. 10 shows an example manual calibration process, in which step 1002 represents detecting the speakers (if not previously detected). Note that some steps such as user interaction to pause, restart or quit the process may be present in the actual UI, but are not shown in FIG. 10 for purposes of simplicity.

Step 1004 outputs an introductory user interface dialog/wizard or the like to help the user. The user may be guided to a particular position, e.g., by approximate guidance ("go to the center of the room or the point at which calibration is to occur") and/or by position sensing technology that is used to interactively tell the user to move left, right, forward or back to the desired position relative to the speakers. Note that the relative positions of the speakers may be estimated using known output patterns and timing of the return signals from each speaker as captured by stereo microphones, (as generally described below with reference to FIG. 11); once known, the relative position of the microphone used for sensing may be estimated in a similar manner.

Step 1006 represents the user selecting a speaker to calibrate. When selected, step 1008 outputs a signal to the selected speaker. The user views the sound pressure level meter and interacts with the controller to increase or decrease the level until the desired pressure is reached. When done, step 1012 repeats the process for each speaker until none remain. Step 1014 indicates completion of the process, and may for example, allow for master volume adjustment, and/or play a reference piece audio track.

Figure 11:
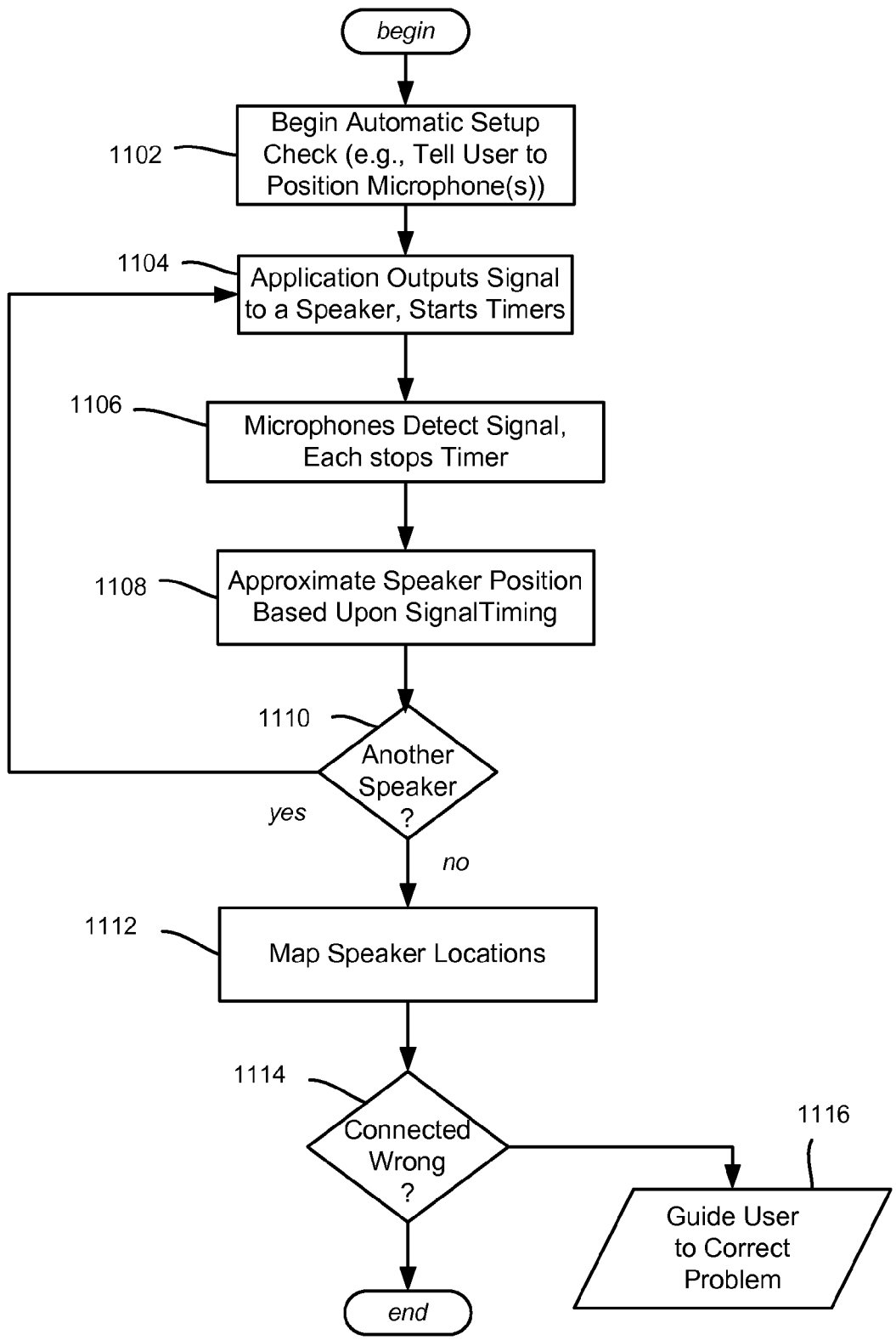
FIG. 11 is a flow diagram representing example steps of a generally automated user speaker configuration setup test, according to one or more example implementations.
Figure 12:
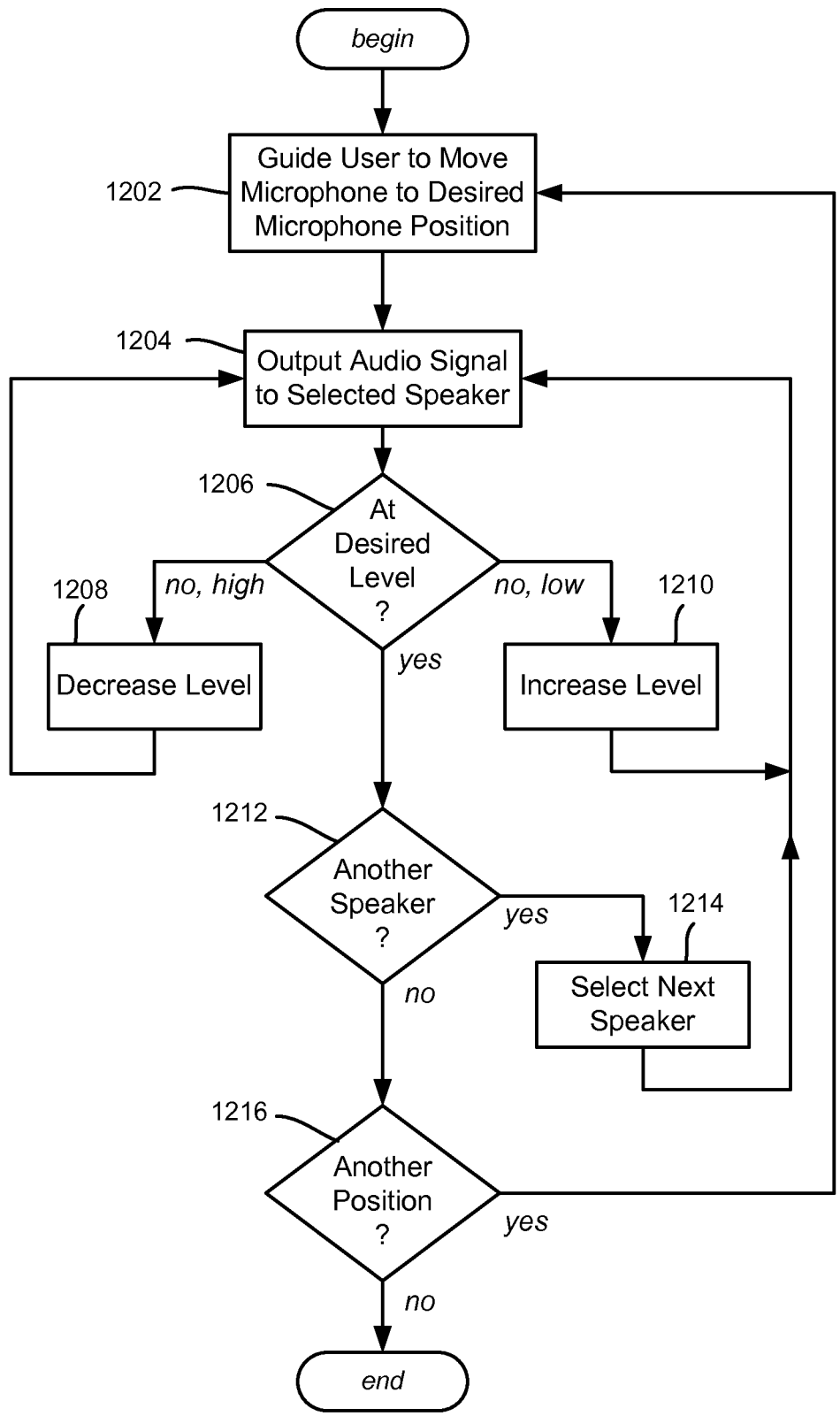
FIG. 12 is a flow diagram representing example steps of a generally automated speaker calibration process, according to one or more example implementations.

FIGS. 11 and 12 are directed towards automated setup testing and automated sound pressure level calibration, respectively. Step 1102 starts the process, and, for example tells the user where to position the microphone(s). At step 1104, the application outputs a signal to a selected speaker, and starts timers, in which the returned audio is sensed by stereo microphones such as in Kinect®; each microphone's sensing of the audio stops a corresponding timer. The distance and relative angle of the speaker to the microphone is thus estimated (step 1108). Step 1110 repeats the process for each connected speaker (if known) or each possibly connected speaker (to determine if one is connected).

When each connected speaker has had its location estimated, step 1112 computes a map of the speakers (not necessarily a visible map, but at least data that represents each speaker's position in some reference coordinate system). Step 1114 evaluates the data and determines if there are any wrong connections, e.g., the left front speaker as output by the console is actually to the right of the center channel speaker, and the right front speaker as output by the console is actually to the left of the center channel speaker, likely indicating they are wired backwards at the speaker amplifier. If an error, step 1116 guides the user to correct the problem.

FIG. 12 is generally directed towards automating the sound pressure leveling process, including guiding the user to a desired microphone position. Step 1204 outputs the audio signal, e.g., when the user has moved the microphone as requested.

Steps 1206, 1208 and 1210 adjust the output so that the sensed level is as desired. Note that increasing or decreasing the sensed level may be incremental, by a binary search-like operation to hone in on the level, by coarse adjustment until close and then fine adjustment, and so on.

Steps 1212 and 1214 repeat the process for each speaker. In the event that multiple calibration positions are desirable, e.g., to obtain some settings for use in dynamic adjustment during playback, step 1216 repeats the process for the different calibration location(s).

Figure 13:
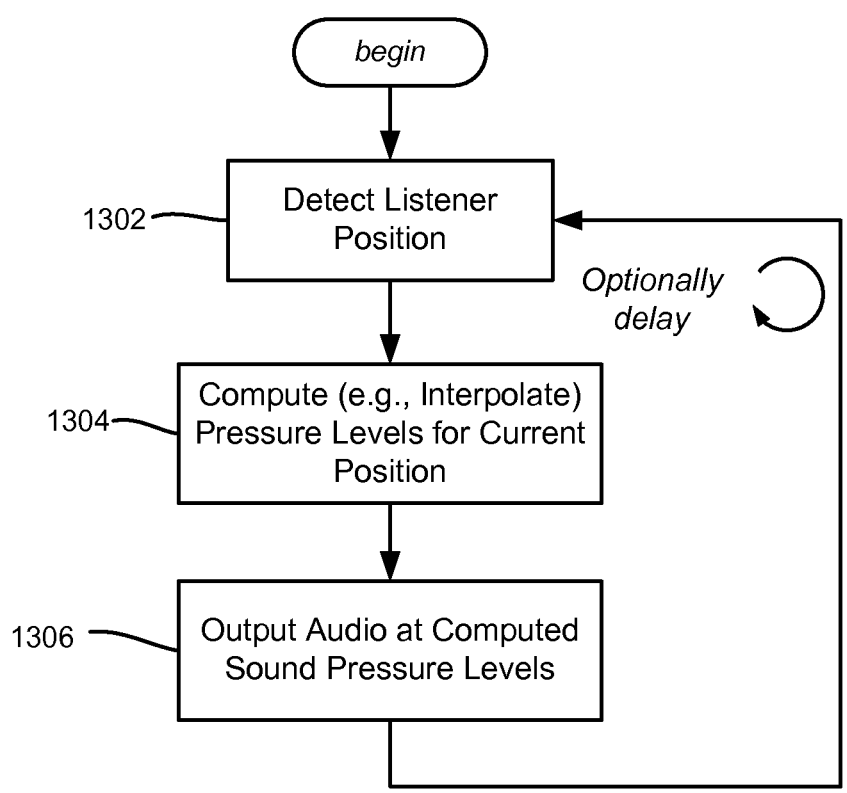
FIG. 13 is a flow diagram representing example steps to dynamically adjust attenuation settings according to a listener's current position, according to one or more example implementations.

FIG. 13 represents dynamic adjustment during playback based upon the current user position. As is understood, the technology applies to multiple users' positions as described above, however for purposes of simplicity FIG. 13 refers to a single user.

Step 1302 detects the current user position, and step 1304 computes the sound pressure levels for this position, e.g., using interpolation. Other aspects such as user head angle, whether the user is known to have a hearing impairment, and so on may be factored into the computation.

Step 1306 outputs the audio at the computed levels. Because the computations are much faster than a user can move, some delay and/or threshold amount of sensed movement may be used to avoid needlessly processing the position data into the same levels or levels that have only imperceptibly small changes.

With automated calibration, various scenarios may be leveraged to enhance the user experience. For example, each piece of media may calibrate (or tweak existing calibration settings) for its particular content. This may be at the beginning of a videogame or during a pause or therein, or even during game play when known audio is playing that includes a desired calibration frequency. Streamed video may include metadata that the console may use for the same purpose.

Different calibration settings may be used for different themes or the like. For example, one theme may correspond to a "midnight mode" (quiet audio increased, loud audio reduced) state of operation, which may be separately calibrated to obtain a corresponding set of attenuation data settings. The audio development team may provide recommended calibration attenuation data settings for a theme, for example, that then may be matched in a calibration operation. For example, classical music may be one theme that has a different set of attenuation data settings than rock music, as may music recorded live versus music recorded in a studio.

As can be seen, aspects are directed towards an audio output device that outputs audio signals to a plurality of speakers. A sound pressure level meter, coupled to a microphone that detects audio from each speaker, provides sound pressure level meter readings to a calibration mechanism. The calibration mechanism uses the readings to perform a calibration operation, e.g., to guide a user in calibrating the sound pressure level of each speaker to a specified level, or to perform an automatic adjustment to the sound pressure level of each speaker to a specified level. The calibration mechanism saves attenuation data for use by the audio device to recreate the audio output at or near the specified level during subsequent audio playback. The calibration mechanism directs a user to position the microphone at a microphone calibration position for each calibration operation.

The audio output device may be coupled to or incorporate a position sensor that detects the user position or the microphone position. The positioning sensor may be used by the calibration mechanism to direct the user to position the microphone at each microphone calibration position.

The sound pressure level meter may be coupled to or incorporated into a computing device that is configured for communication with the audio device. The calibration mechanism may be incorporated into a computing device that is decoupled from communication with the audio device during the calibration operation, and provide the attenuation data to the audio device when later coupled for communication with the audio device, and/or to storage.

Another aspect includes a test setup mechanism, or a test setup mode of the calibration mechanism, the test setup mechanism or test setup mode configured to automatically determine whether the plurality of speakers are properly arranged relative to recorded or streamed audio intended to be output by each speaker. Alternatively (or in addition to automatic testing), the test setup mechanism or test setup mode may interact with the user to determine whether the plurality of speakers are properly arranged relative to recorded or streamed audio intended to be output by each speaker.

The calibration mechanism may be configured to calibrate a plurality of different speaker arrangements, including at least one speaker arrangement that outputs audio that is perceived as coming downwards to a listener. The audio output device may be coupled to or incorporate a position sensor that during recorded or streaming audio playback detects a listener position as listener position data. The audio output device may use the listener position data to dynamically determine the attenuation data for each of a plurality of speakers to adjust the speaker output as the listener changes position.

The calibration mechanism may perform a plurality of calibration operations at different microphone positions to provide a plurality of sets of attenuation data, and the audio output device may dynamically determine a modified set of attenuation data based upon mathematically combining (e.g., interpolating) at least two of the sets of attenuation data for a current listener position. The calibration mechanism may perform a plurality of calibration operations for a plurality of different themes to obtain a set of attenuation data for each theme.

One or more aspects are directed towards guiding a user to move a microphone to a calibration location relative to a plurality of audio speakers. For each speaker, calibration occurs, including outputting a calibration signal to generate audio output, adjusting an attenuation level associated with the calibration signal as needed until a desired sound pressure level as sensed at the calibration location is detected for that speaker, and associating the attenuation data with that speaker. The attenuation data associated with each speaker is saved in a set of attenuation data for the plurality of speakers.

Data from a position sensor may be used to guide the user. Adjusting the attenuation level may be based upon receiving user input, receiving signals from the microphone, or receiving data corresponding to a reading from a sound pressure level meter.

Also described herein is determining whether the plurality of speakers is correctly connected for audio output with respect to their relative locations to one another. This may include informing a user via speech played through a speaker and/or visible information in conjunction with other audio output played through the speaker as to where a system that provides the signals for the speaker intends for the speaker to be located relative to the other speakers.

Further described herein is tracking a listener's position using position data obtained from a position sensor, and dynamically determining modified attenuation data for each of a plurality of speakers based at least in part on the position data one or more sets of saved attenuation data to adjust speaker output as the listener changes position.

One or more aspects are directed towards obtaining a plurality of sets of calibration attenuation data, each set of calibration attenuation data corresponding a calibration location, or a calibration theme, and using at least one set of calibration attenuation data to output audio signals to a speaker based upon listener position data or a currently selected theme.

Usage of the sets of data may include sensing a current position of a listener, and using the calibration attenuation data to mathematically combine at least two sets of calibration attenuation data to output audio signals to a speaker based upon the current listener position.

Obtaining the plurality of sets of calibration attenuation data may comprise guiding a user to a plurality of microphone calibration locations, and performing a calibration operation at each location.

Example Operating Environment

It can be readily appreciated that the above-described implementation and its alternatives may be implemented on any suitable computing device/machine or similar machine logic, including a gaming and/or entertainment system/console, personal (e.g., laptop or desktop) computer, tablet, wearable computing device, appliance (e.g., television, DVR, set-top box), smartphone, standalone device and/or the like. Combinations of such devices are also feasible when multiple such devices are linked together. For purposes of description, a gaming (including media) system is described as one example operating environment hereinafter. However, it is understood that any or all of the components or the like described herein may be implemented in storage devices as executable code, and/or in hardware/hardware logic, whether local in one or more closely coupled devices or remote (e.g., in the cloud), or a combination of local and remote components, and so on.

Figure 14:
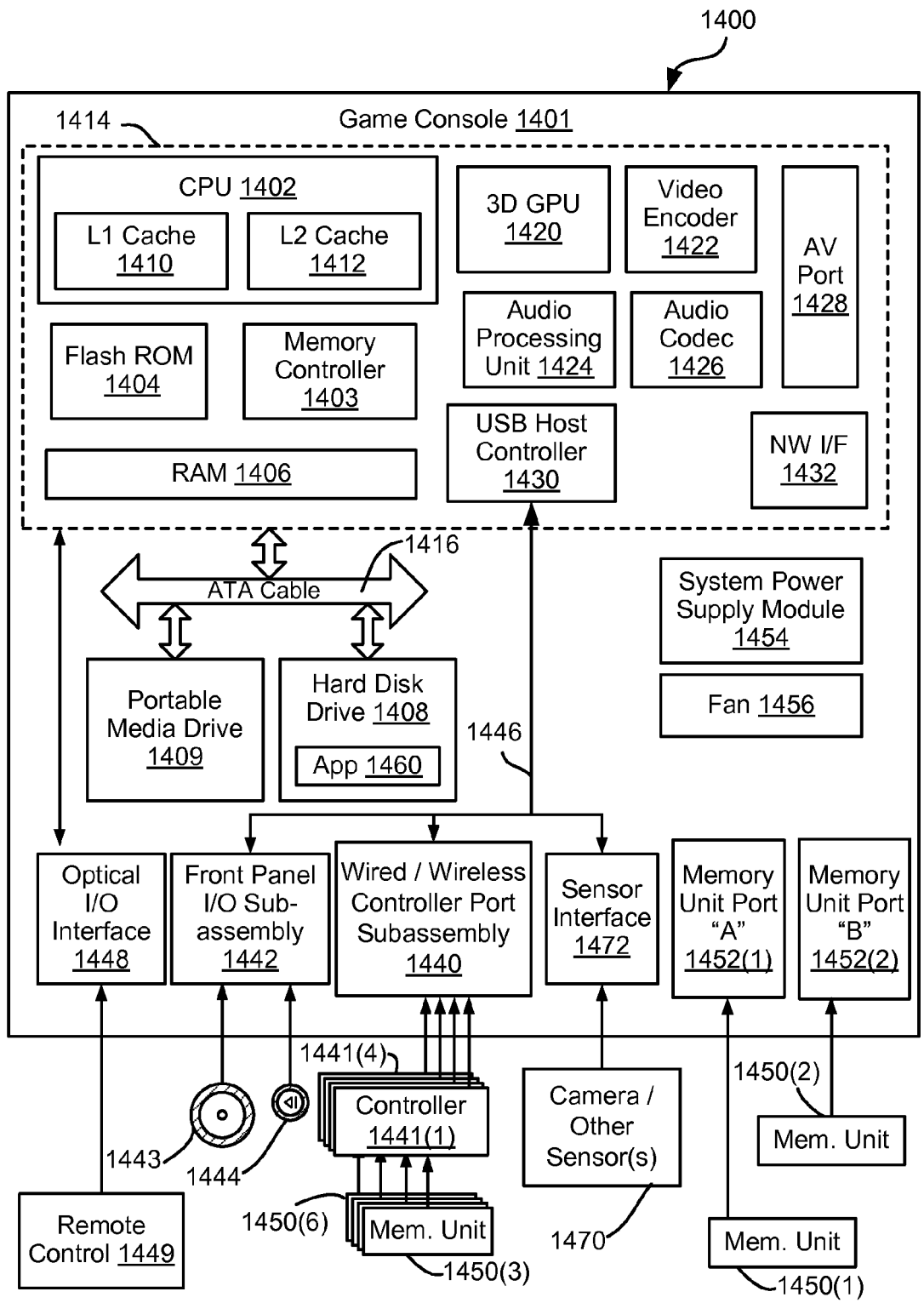
FIG. 14 is a block diagram representing an example non-limiting computing system and/or operating environment, exemplified as a gaming console, in which one or more aspects of various embodiments described herein can be implemented.

FIG. 14 is a functional block diagram of an example gaming and media system 1400 and shows functional components in more detail. Console 1401 has a central processing unit (CPU) 1402, and a memory controller 1403 that facilitates processor access to various types of memory, including a flash Read Only Memory (ROM) 1404, a Random Access Memory (RAM) 1406, a hard disk drive 1408, and portable media drive 1409. In one implementation, the CPU 1402 includes a level 1 cache 1410, and a level 2 cache 1412 to temporarily store data and hence reduce the number of memory access cycles made to the hard drive, thereby improving processing speed and throughput.

The CPU 1402, the memory controller 1403, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 1402, the memory controller 1403, the ROM 1404, and the RAM 1406 are integrated onto a common module 1414. In this implementation, the ROM 1404 is configured as a flash ROM that is connected to the memory controller 1403 via a Peripheral Component Interconnect (PCI) bus or the like and a ROM bus or the like (neither of which are shown). The RAM 1406 may be configured as multiple Double Data Rate Synchronous Dynamic RAM (DDR SDRAM) modules that are independently controlled by the memory controller 1403 via separate buses (not shown). The hard disk drive 1408 and the portable media drive 1409 are shown connected to the memory controller 1403 via the PCI bus and an AT Attachment (ATA) bus 1416. However, in other implementations, dedicated data bus structures of different types can also be applied in the alternative.

A three-dimensional graphics processing unit 1420 and a video encoder 1422 form a video processing pipeline for high speed and high resolution (e.g., High Definition) graphics processing. Data are carried from the graphics processing unit 1420 to the video encoder 1422 via a digital video bus (not shown). An audio processing unit 1424 and an audio codec (coder/decoder) 1426 form a corresponding audio processing pipeline for multi-channel audio processing of various digital audio formats. Audio data are carried between the audio processing unit 1424 and the audio codec 1426 via a communication link (not shown). The video and audio processing pipelines output data to an A/V (audio/video) port 1428 for transmission to a television or other display/speakers. In the illustrated implementation, the video and audio processing components 1420, 1422, 1424, 1426 and 1428 are mounted on the module 1414.

FIG. 14 shows the module 1414 including a USB host controller 1430 and a network interface (NW I/F) 1432, which may include wired and/or wireless components. The USB host controller 1430 is shown in communication with the CPU 1402 and the memory controller 1403 via a bus (e.g., PCI bus) and serves as host for peripheral controllers. The network interface 1432 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 14, the console 1401 includes a controller support subassembly 1440, for supporting at least four game controllers 1441(1)-1441(4). The controller support subassembly 1440 includes any hardware and software components needed to support wired and/or wireless operation with an external control device, such as for example, a media and game controller. A front panel I/O subassembly 1442 supports the multiple functionalities of a power button 1443, an eject button 1444, as well as any other buttons and any LEDs (light emitting diodes) or other indicators exposed on the outer surface of the console 1401. The subassemblies 1440 and 1442 are in communication with the module 1414 via one or more cable assemblies 1446 or the like. In other implementations, the console 1401 can include additional controller subassemblies. The illustrated implementation also shows an optical I/O interface 1448 that is configured to send and receive signals (e.g., from a remote control 1449) that can be communicated to the module 1414.

Memory units (MUs) 1450(1) and 1450(2) are illustrated as being connectable to MU ports "A" 1452(1) and "B" 1452(2), respectively. Each MU 1450 offers additional storage on which games, game parameters, and other data may be stored.

In some implementations, the other data can include one or more of a digital game component, an executable gaming application, an instruction set for expanding a gaming application, and a media file. When inserted into the console 1401, each MU 1450 can be accessed by the memory controller 1403.

A system power supply module 1454 provides power to the components of the gaming system 1400. A fan 1456 cools the circuitry within the console 1401.

An application 1460 comprising machine instructions is typically stored on the hard disk drive 1408. When the console 1401 is powered on, various portions of the application 1460 are loaded into the RAM 1406, and/or the caches 1410 and 1412, for execution on the CPU 1402. In general, the application 1460 can include one or more program modules for performing various display functions, such as controlling dialog screens for presentation on a display (e.g., high definition monitor), controlling transactions based on user inputs and controlling data transmission and reception between the console 1401 and externally connected devices.

As represented via block 1470, a camera (including visible, IR and/or depth cameras) and/or other sensors, such as a microphone, external motion sensor and so forth may be coupled to the system 1400 via a suitable interface 1472. As shown in FIG. 14, this may be via a USB connection or the like, however it is understood that at least some of these kinds of sensors may be built into the system 1400.

The gaming system 1400 may be operated as a standalone system by connecting the system to high definition monitor, a television, a video projector, or other display device. In this standalone mode, the gaming system 1400 enables one or more players to play games, or enjoy digital media, e.g., by watching movies, or listening to music. However, with the integration of broadband connectivity made available through the network interface 1432, gaming system 1400 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
   an audio output device that outputs audio signals to a plurality of speakers,
   a sound pressure level meter coupled to a microphone, the microphone configured to detect audio from the plurality of speakers, and the sound pressure level meter configured to detect a plurality of sound pressure level readings as the sound; and
   a calibration mechanism that performs at least one calibration operation based upon the sound pressure level readings from the sound pressure level meter, the calibration mechanism configured to guide a user in calibrating sound pressure levels of the speakers to specified levels, or to perform an automatic adjustment to the sound pressure levels of the speakers to the specified levels,
   a sensor configured to dynamically monitor a location of a user in a room,
   the calibration mechanism further configured to:
      save attenuation data for use by the audio device that is used to recreate the audio output at or near the specified levels during subsequent audio playback, and
      dynamically adjust the attenuation data based on the sound pressure level readings and the location of the user as the user moves in the room to maintain the audio output provided to the user at or near the specified levels.

2. The system of claim 1 wherein the audio output device is coupled to or incorporates a position sensor that detects the microphone position, the positioning sensor used by the calibration mechanism to direct the user to position the microphone at each microphone calibration position.

3. The system of claim 1 wherein the sound pressure level meter is coupled to or is incorporated into a computing device that is configured for communication with the audio device.

4. The system of claim 1 wherein the calibration mechanism is incorporated into a computing device that is decoupled from communication with the audio device during the calibration operation, the computing device obtaining the attenuation data and providing the attenuation data to the computing device for communication with the audio device, or to storage accessible by the audio device, or both.

5. The system of claim 1 further comprising a test setup mechanism or a test setup mode of the calibration mechanism, the test setup mechanism or test setup mode configured to automatically determine whether the plurality of speakers are properly arranged relative to recorded or streamed audio intended to be output by each speaker, or to interact with the user to determine whether the plurality of speakers are properly arranged relative to recorded or streamed audio intended to be output by the speakers.

6. The system of claim 1 wherein the calibration mechanism is configured to calibrate a plurality of different speaker arrangements, including at least one speaker arrangement that outputs audio that is perceived as coming downwards to a listener.

7. The system of claim 1 wherein the audio output device is coupled a position sensor that during recorded or streaming audio playback detects a listener position as listener position data, and wherein the audio output device uses the listener position data to dynamically determine attenuation data to use for adjusting speaker output as the listener changes position.

8. The system of claim 7 wherein the calibration mechanism performs a plurality of calibration operations at different microphone positions to provide a plurality of sets of attenuation data, and wherein the audio output device dynamically determines a modified set of attenuation data based upon mathematically combining at least two of the sets of attenuation data for a current listener position.

9. The system of claim 1 wherein the audio output device comprises a gaming and entertainment console.

10. The system of claim 1 wherein the calibration mechanism performs a plurality of calibration operations for a plurality of different themes to obtain a set of attenuation data for each theme.

11. The system of claim 1 wherein the audio output device comprises a gaming console.

12. A method performed at least in part on at least one processor, comprising:
   guiding a user to move a microphone to a calibration location relative to a plurality of audio speakers;
   for the plurality of audio speakers:
      outputting calibration signals to generate audio outputs;

adjusting attenuation levels associated with the calibration signals as needed until desired sound pressure levels as sensed at the calibration location are detected for the plurality of audio speakers; and associating the attenuation data with corresponding speakers; and saving the attenuation data associated with the corresponding speakers in a first set of attenuation data for the plurality of speakers;

performing skeletal or head tracking to track movement of the user;

dynamically adjusting the attenuation data associated with the corresponding speakers based on the tracked movement of the user.

13. The method of claim 12 wherein guiding the user comprises using data from a position sensor.

14. The method of claim 12 wherein adjusting the attenuation levels comprise receiving sound pressure readings from a sound pressure level meter.

15. The method of claim 12 further comprising, determining whether the plurality of speakers is correctly connected for audio output.

16. The method of claim 15 wherein determining, at a device, whether the plurality of speakers is correctly connected for audio output comprises informing a user via speech played through a speaker and/or visible information in conjunction with other audio output as to connections for the plurality of speakers.

17. The method of claim 12 further comprising, wherein said performing skeletal or head tracking to track movement of the user comprises tracking a listener's position using position data obtained from a position sensor, and dynamically determining modified attenuation data for at least one of the plurality of speakers based at least in part on position data of one or more sets of saved attenuation data to adjust speaker output as the listener changes position.

\* \* \* \* \*